United States Patent [19]

Abe et al.

[11] 4,259,057

[45] Mar. 31, 1981

[54] METHOD OF CONTINUOUSLY EXTRUDING AND MOLDING CERAMIC HONEY-COMB SHAPED MOLDINGS AND DIE FOR USE IN THE CONTINUOUS EXTRUDING OPERATION THEREOF

[75] Inventors: Kazunobu Abe, Izumi; Shoichi Tamura; Tosiaki Matsuda, both of Sakai, all of Japan

[73] Assignee: Saki Chemical Industry Co., Ltd., Japan

[21] Appl. No.: 974,584

[22] Filed: Dec. 29, 1978

[51] Int. Cl.$^3$ ........................................ B29F 3/04

[52] U.S. Cl. .............................. 425/463; 264/209

[58] Field of Search .................. 264/209; 425/376 R, 425/382 R, 463

[56] References Cited

U.S. PATENT DOCUMENTS

| | | | |
|---|---|---|---|
| 3,790,654 | 2/1974 | Bagley | 264/209 |
| 3,983,283 | 9/1976 | Bagley | 264/209 |
| 4,104,015 | 8/1978 | Meyer | 425/463 |
| 4,118,456 | 10/1978 | Blanding | 264/209 |

*Primary Examiner*—John Parrish

*Attorney, Agent, or Firm*—Jones, Tullar & Cooper

[57] ABSTRACT

The present invention is directed to a method of continuously extruding and molding ceramic honey-comb shaped moldings by use of an extruding die including a tertiary channel grooved, corresponding to the cross-sectional shape of the core unit of the ceramic honey-comb, on the material outlet side of the extruding die; a primary channel composed of many independent holes bored from the material inlet side; and a secondary channel for forming an interlinked passage between the tertiary channel and the secondary channel.

2 Claims, 9 Drawing Figures

METHOD OF CONTINUOUSLY EXTRUDING AND MOLDING CERAMIC HONEY-COMB SHAPED MOLDINGS AND DIE FOR USE IN THE CONTINUOUS EXTRUDING OPERATION THEREOF

The present invention relates to a method of continuously extruding and molding honey-comb shaped moldings made of ceramics and a die for use in the continuously extruding operation thereof.

Generally, the ceramic honey-comb is formed by arranging in the proper adjacent relationship of empty core units each being, in shape, square, regular hexangle, regular triangle, circular and variable as desired, and is used for many applications as a catalyst carrier, for example, a catalyst carrier for treating car exhaust gas, since the ceramic honey-comb is superior in heat resistance and corrosion resistance, lower in price, and the pressure loss due to liquid flowing is small. In addition, the honey-comb is used in manufacturing heat exchange; construction materials such as adiabatic materials, sound-proof materials or the like; and as an electronic substrate.

Conventionally, as the methods of manufacturing the honey-combs made of the ceramics having a plurality of core units with the wall thickness disposed between the core units being thinner and the cross-sectional area of each of the core units being smaller, there are known, for instance, a method of charging the mixture of the ceramic powders and the plasticizers into the mold and performing the molding operation for the mixture through mechanical press, and a casting method comprising pouring hydraulic ceramic slurries into a honey-comb female mold, hardening and separating them from the mold. In addition, in the Japanese Patent Publication No. 1232/1976, there is shown a so-called extruding method comprising steps of making plastic composition material including carrier material or compound which can become the carrier material through thermal cracking or reaction, liquid and viscosity adjusting material which can be soluble in the liquid or can be swollen in the liquid; continuously pushing the material, by means of a piston of known type, through a zone having a plurality of intermittent primary channels 12 in a solid block 10 as shown in FIG. 1 and FIG. 2; then maintain pressure on the material for time sufficient for the supply materials to be unified into a module, through a unifying zone having a secondary channels 14, within the solid block 10, each secondary channel being mutually coupled along the continuous curve in a lateral direction related to the primary flowing direction of the plastic composition material, the total cross-sectional area of the secondary channels being sufficiently smaller than the total cross-sectional area of the primary channels 12, and drying the module thus obtained and firing it, so that the ceramic honey-comb may be obtained.

In the extruding method employing the solid block 10 of FIGS. 1 and 2, since the ceramic honey-comb shaped moldings can be continuously extruded, the productivity thereof is better and the cost can be reduced as compared with the press method or the casting method. The primary channels 12 as the intermittent, independent holes are directly connected with the secondary channels 14 as the channels for molding the ceramic honey-comb, and the plastic compositions which have been pushed through each primary channel 12 have to be completely coherent and extruded as a unitary molding while the plastic compositions are at the same time pushed on into the secondary chamber 14. Therefore, the length of the secondary channels 14 is made sufficiently longer or the cross-sectional area of the secondary channels 14 is established to be sufficiently smaller than the cross-sectional area of the primary channels 12 so that the materials are forced to flow in the lateral direction to promote the adhesion since the extruding pressure is required to be larger. As a disadvantage, the entire extruding machine becomes bigger. On the other hand, the cross-sectional area of the primary channels is required to be sufficiently larger than the cross-sectional area of the secondary channels since the extruding pressure to be applied is limited in terms of the pressure resistance strength of the die. Accordingly, when the wall of the honey-comb is thin, the adherence of the materials forming the honey-comb molding becomes insufficient and cracks are caused in the wall face of the molding, therefore a honey-comb body which has high in mechanical strength cannot be produced.

The present invention is directed to removing the disadvantages caused during the continuous extrusion molding operation of the ceramic honey-comb moldings by use of the extruding die. Therefore, it is an object of the present invention to provide a method of continuously extruding and molding ceramic honey-comb shaped moldings and a die for use in the continuous extruding operation thereof for manufacturing a ceramic honey-comb which is substantially free from such drawbacks as inherent in a similar product manufactured by the prior art methods referred to above. Another object of the present invention is to provide the method and a die of the type referred to above capable of producing a ceramic honey-comb which satisfactorily and effectively can be used as a light-weight, compact size, high strength construction material in substitution for a conventional one due to its physical properties comparable with those of the conventional one. According to the present invention, there is provided a method which employs the use of an extruding die of simple structure including tertiary channels comprising optionally shaped molding channels grooved on the material outlet side of the extruding die to correspond to the desired cross-sectional shape of the core unit of the ceramic honey-comb, primary channels composed of a plurality of independent holes bored from the material inlet side, and secondary channels comprising the channels connecting between the primary inlet channels and the tertiary molding outlet channels, located between the overlapping portions of the ends of the primary inlet channels bored into the tertiary molding outlet channels. In the method of the invention, the plastic composition material is extruded from the independent primary channels to the overlapping portion of the primary and tertiary channels and then in the overlapping portion the flow of the plastic composition materials is partially changed to the lateral direction to sufficiently supply the plastic composition materials in the lateral direction, adhering the materials in advance with respect to each other in the entire area of the secondary channel, thereafter uniformly extruding the materials while completing the adherence by further pressure into the molding channels, continuously extruding the moldings without causing cracks in the wall face of the moldings during the extruding operation with relatively low extruding pressures, during the drying operation and during the firing operation where the length of the tertiary channel is short, where the cross-sectional area of the independent hole is relatively small and, where the wall is thin, or continuously extruding the moldings with high extending force where the high extruding force is required.

More specifically, the present invention is directed to a method of continuously extruding and molding ceramic honey-comb shaped moldings formed from an extrudable plastic composition material including the material for a ceramic honey-comb body or a compound, viscosity adjusting material, etc., the compound becoming the material which forms a ceramic honey-comb body through thermal cracking or reaction, which method comprises injecting the extrudable material into primary channels, composed of a plurality of mutually independent holes bored in parallel with respect to one another towards the extrudable material outlet side from the extrudable material inlet side of the extruding die, then extruding said materials into secondary channels partially communicating each of the independent holes with one another, and being open and connected to the ceramic honey-comb molding channels provided on the material outlet side of the extruding die, mutually adhering, in said secondary channel, the plastic composition materials supplied from the mutually independent holes constituting the primary channel, thereafter pushing said materials into the molding channels constituting a tertiary channel wherein the relationship between the sum of the total cross-sectional area of a primary channel and the total cross-sectional area of the communicating portion among the independent holes of the secondary channels communicating with said primary channel and the total cross-sectional area of the tertiary channels communicating with said primary and secondary channels is established so that said materials are sufficiently adhered in and are extruded into the secondary channel and the tertiary channel, and continuously extruding the ceramic honey-comb shaped moldings onto the extruding side.

According to the present invention, there is also provided, in an apparatus which applies pressure to the plastic composition materials, in an extruding machine, at the material inlet side of the extruding die and continuously extrudes the ceramic honey-comb shaped moldings from the material outlet side of said extruding die, a die for the continuous extrusion of ceramic honey-comb shaped moldings wherein a plurality of holes are provided, each of the holes being $(d_2+d_3)$ in predetermined depth and being mutually independent in the material-flow axial direction from the material inlet side of the extruding die of $(d_1+d_3+d_2)$ in thickness, ceramic honey-comb molding channels each being $(d_1+d_3)$ in predetermined depth being provided from the material outlet side of the extruding die to form the overlapping portion $d_3$ in depth between the independent holes and the molding channels, these mutually independent holes being communicated with one another, the relationship between the total cross-sectional area of the molding channel and the sum of the total cross-sectional area of the independent hole and the total cross-sectional area of the communicating portion formed through the overlapping of the independent holes and the molding channels is established so that said materials are adapted to be extruded to be sufficiently pressed under pressure in the overlapping portion and the molding channels.

In any event, these and other objects and features of the present invention will become apparent from the following description taken in conjunction with preferred embodiments thereof with reference to the accompanying drawings, in which.

Before the description of the present invention proceeds, it is to be noted that like parts are designated by like reference numerals throughout the accompanying drawings.

Figure 3:
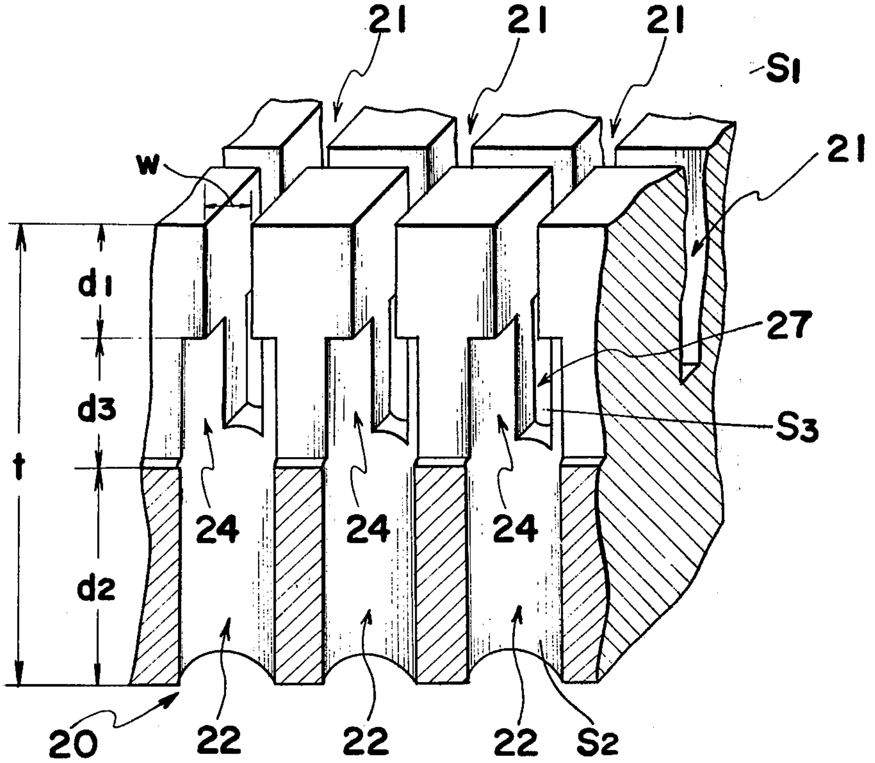
FIG. 3 is a perspective view, on an enlarged scale, showing a partial cross-section of an extruding die in accordance with one preferred embodiment of the present invention.

Referring to FIG. 3, an extruding die for honey-comb moldings of ceramics in accordance with one preferred embodiment of the present invention will be described hereinafter.

Figure 4:
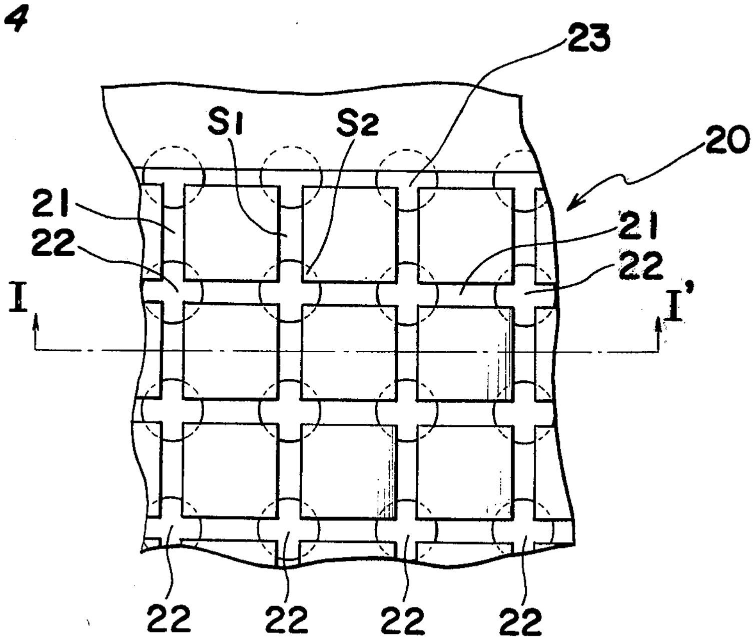
FIG. 4 is a plan view showing a partially broken of the extruding die of FIG. 3.
Figure 8:
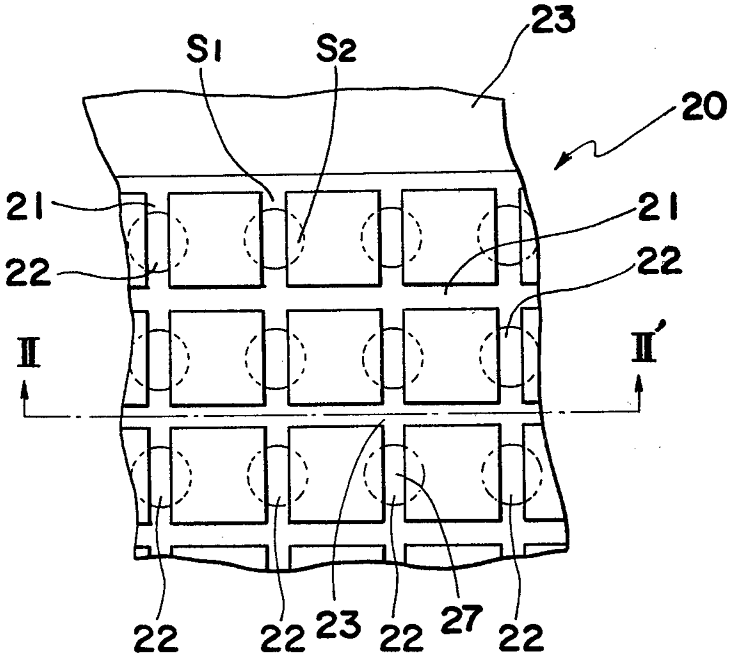
FIG. 8 and FIG. 9 are respectively a plan view and a cross-sectional view taken along a line II—II' of FIG. 8, showing another modified embodiment corresponding to those of FIG. 4 and FIG. 5.

The extruding die 20 for use in continuously extruding and molding ceramic honey-comb in an extruding machine, which pushes the plastic composition material from the material inlet side towards the material outlet side of the extruding die disposed along the material-flow axial direction, is provided a plurality of independent circular holes 22 at the material inlet side and a plurality of continuously molding channels or grooves 21 at the material outlet side in alignment with the circular holes 22, said holes 22 and channels 21 being interlinked with each other through openings or passage 24. In the extruding die 20, the molding channels 21 each having width W equal to the wall thickness of the honey-comb are cut from the material outlet side of the metallic block towards the material inlet side by a predetermined depth $(d_1+d_3)$ in, for example, checker-board shape or square-shape in accordance with the core unit of the ceramic honey-comb. The independent holes 22 are drilled in parallel with the others, each hole having a predetermined depth $(d_2+d_3)$ from the material inlet side of the metallic block towards the material outlet side, the central line thereof preferably passing through the center of the intersecting portion 23 of the molding channel 21, as shown in FIG. 4, or the central portion 27, as shown in FIG. 8, of the molding channel 21. The openings 24 are formed as portions extruding from the holes 22 or the channels 21 and overlapping between the holes 22 and the channels 21 with a predetermined depth $d_3$, and the sum of the depth $d_1$ of the molding channel 21 and the depth $d_2$ of the independent hole 22 is provided smaller than the thickness of the extruding die 20. It is to be noted that the relationship between the total cross-sectional area $S_1$ of the molding channel 21 and the sum $(S_2+S_3)$ of the total cross-sectional areas $S_2$ of the independent hole 22 and the total cross-sectional area $S_3$ of the opening 24 where the side wall face of the independent hole 22 is cut by the molding channel 21 is provided so that the material pushed by the extruding machine may be extruded without any voids through the overlap opening 24 and molding channel 21, i.e., the latter ($S_2+S_3$) may become sufficiently larger than the former $S_1$.

The overlap opening 24 connects the independent hole 22 with the molding channel 21 by the depth $d_3$, so that the side portion of the independent hole 22 is mutually communicated with the side portion of the molding channel 21 and is connected to open to the molding channel 21.

Figure 1:
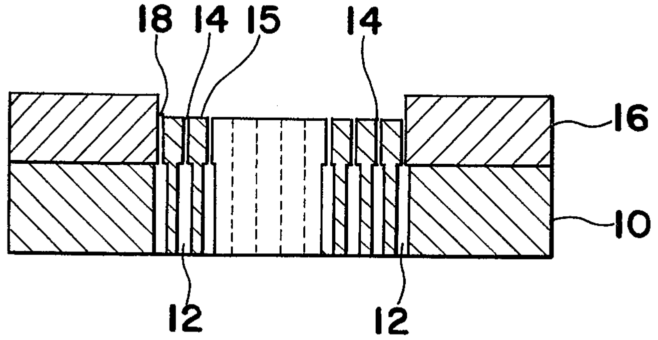
Fig. 1 PRIOR ART
FIG. 1 is a cross-sectional view of the conventional extruding die as mentioned hereinbefore.
Figure 2:
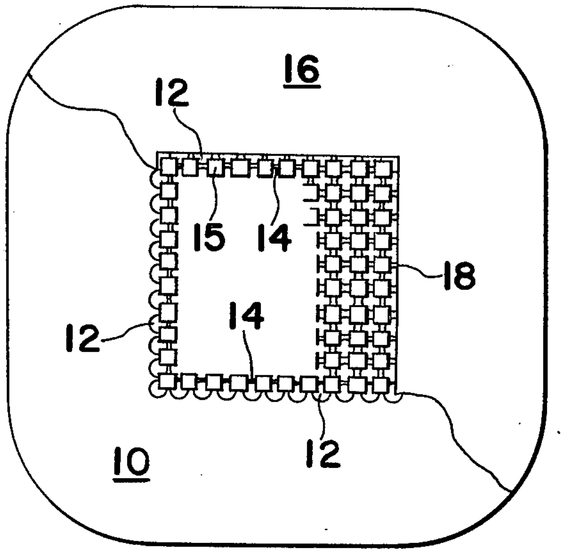
Fig. 2 PRIOR ART
FIG. 2 is a plan view of the conventional extruding die of FIG. 1.
Figure 5:
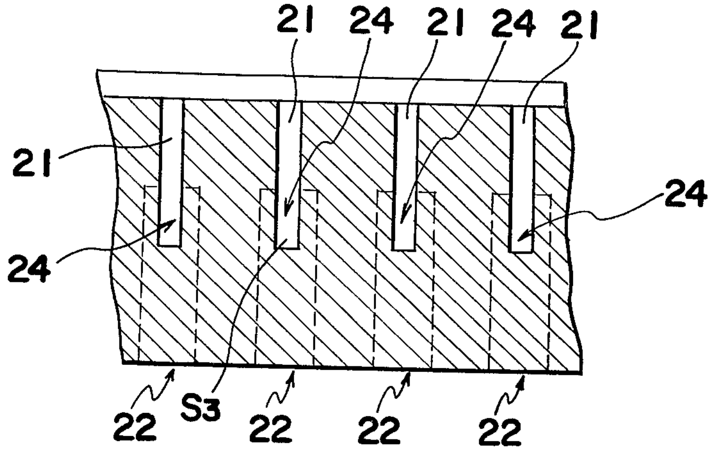
FIG. 5 is a cross-sectional view taken along a line I—I' of FIG. 4.
Figure 6:
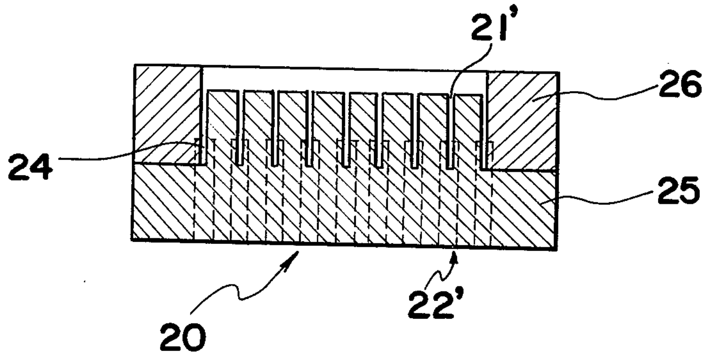
FIG. 6 is an illustrating view for manufacturing the extruding die in employment of the extruding die of FIG. 3.
Figure 9:
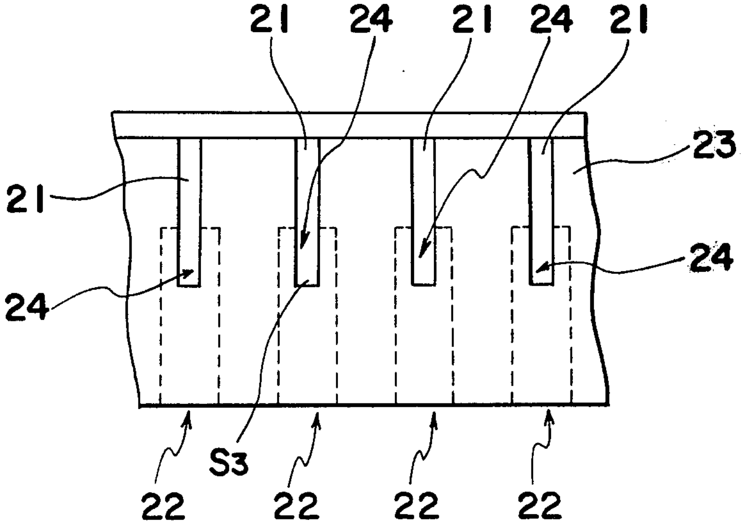

A plan view of the die 20 seeing from the material outlet side is similar to that of FIG. 2 wherein each of the independent hole 22 is provided respectively in a position corresponding to the vertex or to the center of the side member of a square which is in the cross-sectional shape of the core unit of the ceramic honey-comb as shown in FIG. 4 or FIG. 8, each of the molding channel 21 being formed to extend at a right angle at the center of each of the independent hole 22 or to extend through the center of the independent hole to form a checkerboard shape in accordance with the core unit of the ceramic honey-comb. In FIG. 4 or FIG. 8, for example, the cross-sectional view taken along a line I—I' or II—II' between the independent hole 22 in the second line from the top and the independent hole 22 in the third line therefrom is different from the cross-sectional view of FIG. 1 at a point showing that the independent hole 22 cuts into the molding channel 21 or the molding channel cuts into the independent hole to form the overlap opening 24 between the hole 22 and the channel 21 as shown in FIG. 5 or FIG. 9. For example, as shown in FIG. 6, according to the manufacturing operation of the extruding die, a metallic block 25 is provided, which is equal, in thickness prior to the working operation, to the sum of the depth $d_1$ of the molding channel 21, the thickness $d_3$ of the overlap opening 24 and the depth $d_2$ of the independent hole 22. In the metallic block 25, a circular hole 22' of depth ($d_2+d_3$) is bored by drilling operation, discharging operation or the like, in a position corresponding to the cross-section shaped vertex of the core unit, from the underside of the metallic block towards the top face. In the top-face side of the metallic block 25, the outer peripheral portion of the top face is cut through the mechanical working operation, with the exception of the portion forming the molding channel 21 and the overlap opening 24. Thereafter, many rectilinear channels 21 each being ($d_1+d_3$) in depth and passing through the circular hole 22 are formed from the top face of the metallic block 25 towards the top face in longitudinal and lateral directions through cutting operation, discharging working operation, ultrasonic wave working operation or the like. A flange-shaped block 26 is engaged into the cut portion in the metallic block 25 thus manufactured to mutually secure them with bolts (not shown), etc., whereby the extruding die 20 is manufactured.

The boring process of the circular hole 21 and the grooving process of the rectilinear channel can be inversely performed.

A method of continuously extruding the ceramic honey-comb moldings with the extruding die 20 engaged with an extruding machine of piston type will be described hereinafter.

Figure 7:
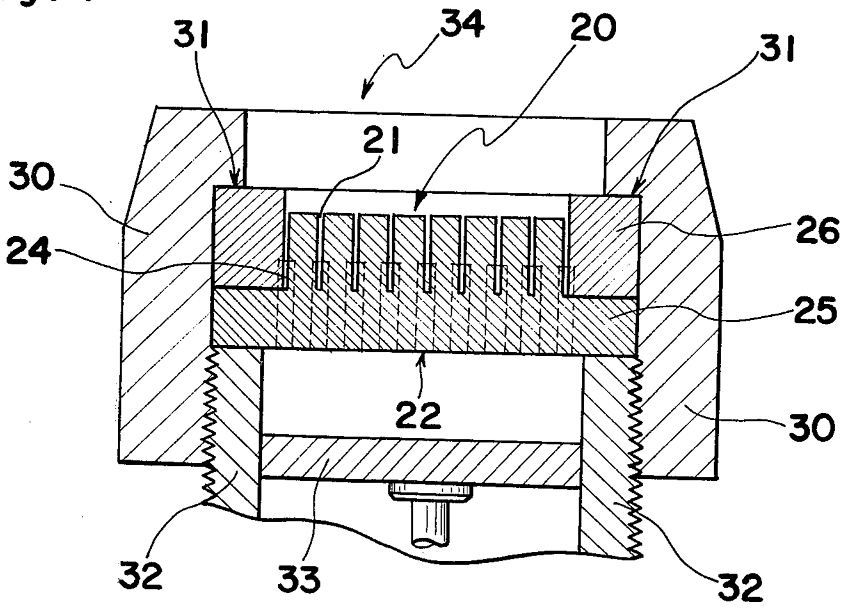
FIG. 7 is a cross-sectional view showing an essential portion of an extruding machine provided with an extruding die of FIG. 3.

As shown in FIG. 7, the extruding die 20 is engaged into the engaging portion of a mounting member 30 to come into contact against the stage portion 31 of the engaging portion. Then, the mounting member 30 is engaged with a cylinder body 32 of the extruding machine through screwing operation. However, the mounting means is not restricted to the above-described mounting member. In addition, the well-known extruding machines of conventional type, in addition to a plunger type or auger type of extruding machines, can also be used.

The plastic composition to be molded through the extruding operation is made through addition of plasticizer, water, etc. to refractory oxide, or to compound thermally decomposable or reactable thereto, or to mixture of the oxide or the compound. At this time, the plastic composition reaches a plastic viscosity zone through the normal temperature or the heating operation.

As the refractory oxide mixture, hydraulic cement, or alumina, titania, zirconia, mullite, or burning kaolin, etc., in addition to, except the above-described oxides catalytic material or inner reinforcing agent such as glass fiber, mineral fiber, etc. may be added within the plastic composition.

Also, as the plasticizer, in addition to bentonite and other water swelling clay (inorganic plasticizer), there are used soluble or swelling organic plasticizer such as starch, cellulose ether, polyvinyl alcohol, polyethylen oxide etc.

The plastic composition made with such materials as described hereinabove is filled into the front room of the cylinder body disposed between a piston and the die 20 as shown in FIG. 7 and pressed into the extruding die 20 by the piston 33 of the extruding machine. The plastic composition material is once extruded into the independent hole 22 constituting the primary channel and, then, into the opening 24 constituting the secondary channel from the primary channel. Thereafter, the material is advanced into a molding channel 21 constituting a tertiary channel. The ceramic honey-comb moldings are continuously extruded from the tertiary channel. However, when the plastic composition material is extruded from the primary channel to the secondary channel, the relationship between the total cross-sectional area $S_1$ of the molding channel 21 and the sum of the total cross-sectional area $S_2$ of the independent hole 21 and the total cross-sectional area $S_3$ of a portion where the independent hole side wall face is cut by the molding channel 21 is established so that the latter ($S_2+S_3$) may be sufficiently greater than the former $S_1$ and the material may be extruded while the material is being sufficiently attached under pressure in the secondary channel and the tertiary channel and is uniformly spread in approximately longitudinal and lateral directions through the second channel of the overlap opening. The materials discharged from each of the primary channel of the independent hole adhere against each other through the second channel and are squeezed out into the tertiary channel, which is smaller in total cross-sectional area than the secondary channel, whereby the close adherence among the materials are provided. The materials are pushed forwardly at approximately uniform rate and are continuously extruded from the extruding opening 34 of the extruding machine 32.

As apparent from the above description, the adherence of the plastic composition extruded from the primary channel is performed in advance in the secondary channel and is further secured in the tertiary channel. Since the materials are advanced at approximately uniform rate through the tertiary channel by the function of the secondary channel, the moldings are hardly cracked even at the condition where the extruding pressure of the extruding machine 32 is low, thus ensuring the production of the moldings with superior packing therein.

Though, in the above embodiment, the cross-sectional shape of the core unit of the ceramic honey-comb is made square and the square-shaped molding channel 21 has been described, the shape of the molding channel 21 is not restricted to the square shape. Needless to say, the shape thereof can be made polyon, circular or the like. Also, the cross sectional shape of the independent hole 22 can be made not only circular, but also variable.

As apparent from the detailed description, according to the present invention, in the smaller-sized extruding machine, the primary channel, the secondary channel and the tertiary channel are provided in order in the extruding die towards the material outlet side from the material inlet side of the plastic composition material. In the secondary channel, the plastic composition which is continuously extruded from the primary channel is uniformly spread and mutually adhered in advance. Thereafter, the plastic composition is uniformly pushed forwardly, while it is being squeezed out in the tertially channel. Thus, the ceramic honey-comb provided is not cracked even if the composition is extruded under low pressures. In addition, the cracks, etc. are hard to be produced even during the drying operation because of the superior packing. Also, the extruding pressure of the extruding machine can be made smaller and the extruding machine is construed in compact.

A metallic mold of the extruding die in the present invention is effective even in the case where not only the plastic material composed of the ceramics including glass fibers or reinforcement and the like, but also the organic plastic material such as plastic, etc. and the inorganic plastic material such as gypsum, etc. are extruded and molded.

In addition thereto, further changes and modifications are apparent to those skilled in the art upon reading of the description of the present invention with or without reference to the accompanying drawings. Therefore, these changes and modifications are to be construed as included within the true scope of the present invention unless they depart therefrom.

What is claimed is:

1. A die for extruding ceramic honey-comb shaped moldings which comprises:

(a) a die body having opposed inlet and outlet faces, said die body having a thickness between said faces of $d_1+d_3+d_2$, $d_1$, $d_3$ and $d_2$ each being a predetermined distance the sum of which is said thickness, having (b) a plurality of independent parallel extrudable molding material inlet channels extending from the inlet face of the die toward the outlet face of the die a distance which is $d_2+d_3$, and (c) a plurality of honey-comb molding channels forming a shape in accordance with the core unit of the ceramic honey-comb to be molded by the die, extending from the outlet face of the die toward the inlet face of the die a distance which is $d_1+d_3$, (d) each of said inlet channels intersecting at least one of said molding channels to form secondary channels comprising the interior portions of said molding channel, with a depth of $d_3$, between the terminal end of the inlet channel and the interior end of the molding channel, said secondary channels adapted to provide lateral flow of molding material within the molding channel between molding material inlet channels thereby providing a strong, void free extruded molding.

2. The die as in claim 1 wherein the sum of the total cross-sectional area of the material inlet channel ($S_2$) and the total cross-sectional area of the secondary channel ($S_3$) is larger than the total cross-sectional area ($S_1$) of the molding channel.

* * * * *